United States Patent
Abdallah et al.

(10) Patent No.: US 11,134,515 B2
(45) Date of Patent: Sep. 28, 2021

(54) CONTENTION-BASED RANDOM ACCESS WITH RECEIVE BEAMFORMING IN WIRELESS NETWORKS

(71) Applicant: SONY GROUP CORPORATION, Tokyo (JP)

(72) Inventors: Ramy Abdallah, San Jose, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/778,308

(22) Filed: Jan. 31, 2020

(65) Prior Publication Data

US 2020/0170037 A1    May 28, 2020

Related U.S. Application Data

(63) Continuation of application No. 15/851,541, filed on Dec. 21, 2017, now Pat. No. 10,568,132.

(Continued)

(51) Int. Cl.
    *H04W 16/28*    (2009.01)
    *H04B 7/06*     (2006.01)
    (Continued)

(52) U.S. Cl.
    CPC .......... *H04W 74/08* (2013.01); *H04B 7/0617* (2013.01); *H04B 7/088* (2013.01);
    (Continued)

(58) Field of Classification Search
    CPC ..... H04W 74/08; H04W 16/28; H04W 74/02; H04W 74/006; H04B 7/0617; H04B 7/088; H04B 7/0695
    See application file for complete search history.

(56) References Cited

U.S. PATENT DOCUMENTS 8,280,445 B2   10/2012  Yong
8,437,333 B2    5/2013  Chu
(Continued)

FOREIGN PATENT DOCUMENTS

JP      2008533772 A    8/2008
KR   1020150117217 A   10/2015
(Continued)

OTHER PUBLICATIONS

Korean Intellectual Property Office (KIPO), Notice of Preliminary Rejection dated Jun. 22, 2020, related Korean patent application No. 10-2019-7019388, pp. 1-7, English-language translation, pp. 8-14, claims examined, pp. 15-19.

(Continued)

*Primary Examiner* — Huy D Vu
*Assistant Examiner* — Bailor C. Hsu
(74) *Attorney, Agent, or Firm* — O'Banion & Ritchey LLP; John P. O'Banion

(57) ABSTRACT

Wireless communication is performed in a wireless network by dividing up a data transmission interval (DTI) within the communication frame into a plurality of time slots based on determining the number of best sector directions from the AP to each STA in the wireless network. Each STA transmits only during this time slot, while the AP uses receiver beamforming and receives only from a single beamforming direction for each of these time slots. A time slot may be used by more than one STA if they are in the same best antenna sector direction from the AP, wherein they contend for access within this time slot.

10 Claims, 10 Drawing Sheets

Related U.S. Application Data

(60) Provisional application No. 62/445,786, filed on Jan. 13, 2017.

(51) Int. Cl.
    *H04W 74/08*     (2009.01)
    *H04B 7/08*     (2006.01)
    *H04W 74/02*     (2009.01)
    *H04W 74/00*     (2009.01)

(52) U.S. Cl.
    CPC ........... *H04W 16/28* (2013.01); *H04W 74/02* (2013.01); *H04B 7/0695* (2013.01); *H04W 74/006* (2013.01)

(56) References Cited

U.S. PATENT DOCUMENTS

| | | |
|---|---|---|
| 8,477,813 B2 | 7/2013 | Zhang |
| 8,548,082 B2 | 10/2013 | Liao |
| 8,553,659 B2 | 10/2013 | Nandagopalan |
| 8,917,675 B2 | 12/2014 | Qin |
| 9,237,582 B2 | 1/2016 | Seol |
| 9,301,285 B2 | 3/2016 | Hong |
| 9,351,313 B2 | 5/2016 | Trainin |
| 9,621,249 B2 | 4/2017 | Cordeiro |
| 9,906,277 B2 | 2/2018 | Choi |
| 2007/0287473 A1 | 12/2007 | Dupray |
| 2008/0002733 A1* | 1/2008 | Sutskover ............ H04L 5/0037 370/436 |
| 2010/0157955 A1 | 6/2010 | Liu |
| 2010/0214169 A1* | 8/2010 | Kafle ................ H04B 7/0695 342/368 |
| 2010/0265924 A1* | 10/2010 | Yong ................ H04B 7/0695 370/336 |
| 2010/0265925 A1 | 10/2010 | Liu |
| 2012/0026987 A1 | 2/2012 | Jain |
| 2012/0058775 A1 | 3/2012 | Dupray |
| 2013/0044695 A1 | 2/2013 | Xu |
| 2013/0285855 A1 | 10/2013 | Dupray |
| 2014/0314019 A1 | 10/2014 | Hong |
| 2015/0055610 A1 | 2/2015 | Trainin |
| 2015/0071185 A1* | 3/2015 | Trainin ................ H04B 7/0617 370/329 |
| 2015/0103756 A1* | 4/2015 | Sinha ................... H04B 7/0491 370/329 |
| 2015/0289147 A1 | 10/2015 | Lou |
| 2016/0044517 A1 | 2/2016 | Raghavan |
| 2016/0191132 A1 | 6/2016 | Rajagopal |
| 2016/0255660 A1 | 9/2016 | Son |
| 2017/0126303 A1* | 5/2017 | Jo ........................ H04B 7/0621 |
| 2017/0142017 A1 | 5/2017 | Davis |
| 2018/0145732 A1 | 5/2018 | Shen |

FOREIGN PATENT DOCUMENTS

| | | |
|---|---|---|
| WO | 2006086429 A2 | 8/2006 |
| WO | 2009147662 | 12/2009 |
| WO | 2011114330 | 9/2011 |
| WO | 2014055294 | 4/2014 |
| WO | 2014199537 A1 | 12/2014 |

OTHER PUBLICATIONS

Akhtar, Anique et al., "Efficient Network Level Beamforming Training for IEEE 802.11ad WLANs", IEEE 2015 International Symposium on Performance Evaluation of Computer and Telecomunications Systems (SPECTS), Chicago, IL, Jul. 26-29, 2015, pp. 1-6.

ISA/RU, Federal Institute of Industrial Property, International Search Report and Written Opinion dated May 10, 2018, related PCT international application No. PCT/US2018/013276, pp. 1-7, claims searched, pp. 8-12.

Miletic, Emilija et al., "MAC Protocol Requirements for WLAN's with Beamforming", 18th Telecommunications forum TELFOR 2010, Serbia, Belgrade, Nov. 23-25, 2010, pp. 412-415.

Abu-Surra, Shadi et al., "IEEE P802.11 Wireless LANs, PHY/MAC Complete Proposal Specification", doc.: IEEE 802.11-10/0433r2, May 18, 2010, 335 pages, see pp. 174-181, downloaded from <URL:https://mentor.ieee.org/802.11/dcn/10/11-10-0433-02-00ad-cp-specification.docx> on Dec. 22, 2020.

* cited by examiner

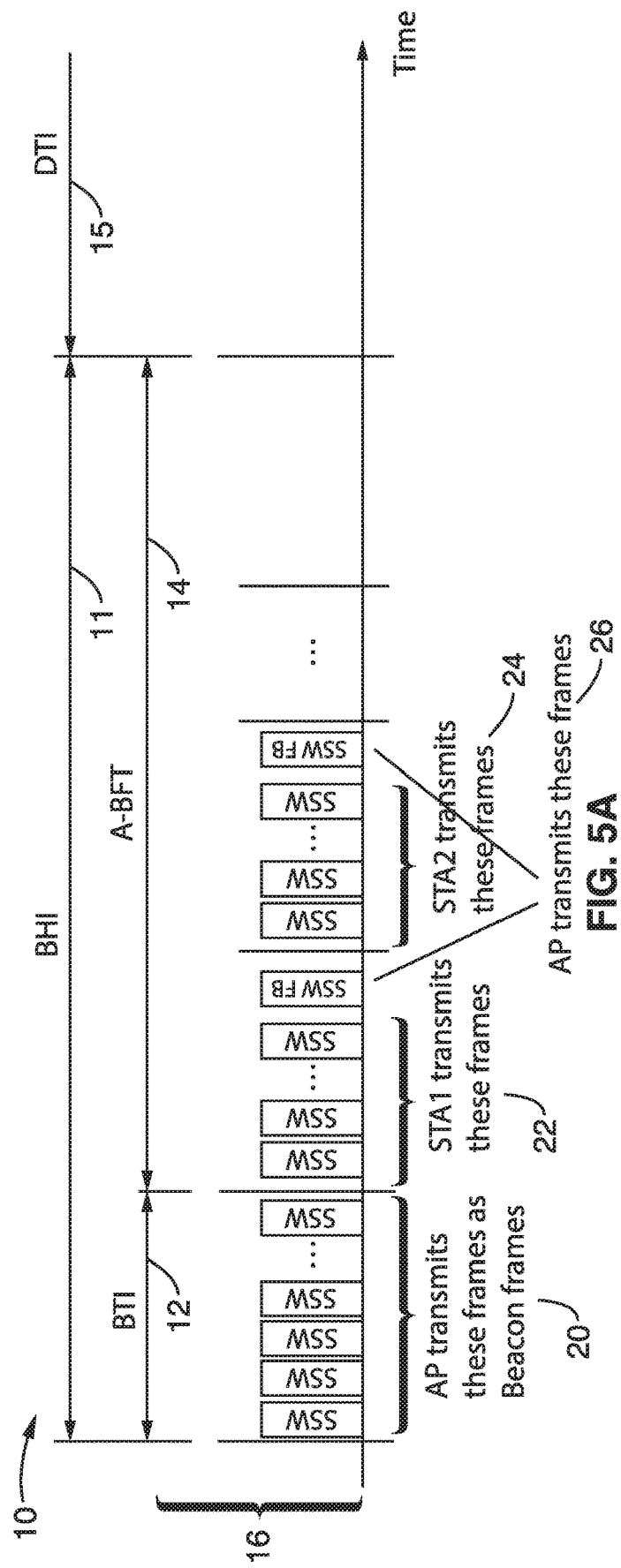
FIG. 5A
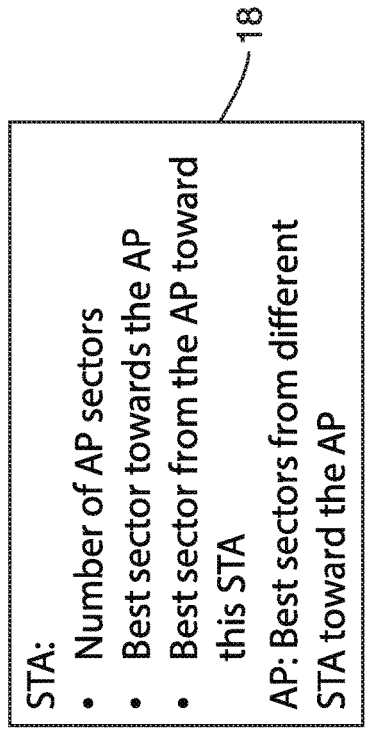
FIG. 5B
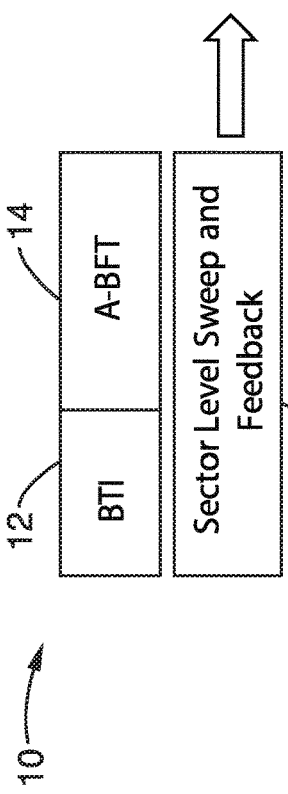

FIG. 11

| Frame Control | Duration | BSSID | Time Stamp | SSW | Schedule | RXBF Control | Misc Info | FCS |

Beacon frame format ~130

FIG. 12

| RXBF Flag | Schedule Index | BF Slot |

RXBF Control field format ~150

FIG. 13

| Element ID | Length | Allocation 1 | ... | Allocation N |

~190

Allocation 1 (192):
| Schedule Index | Allocation Type | Allocation Start | Allocation Duration | Number of Blocks | Allocation Block Period |

194

CONTENTION-BASED RANDOM ACCESS WITH RECEIVE BEAMFORMING IN WIRELESS NETWORKS

CROSS-REFERENCE TO RELATED APPLICATIONS

This application is a continuation of U.S. patent application Ser. No. 15/851,541 filed on Dec. 21, 2017, incorporated herein by reference in its entirety, which claims priority to, and the benefit of, U.S. provisional patent application Ser. No. 62/445,786 filed on Jan. 13, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to utilizing scheduled receiver beamforming in slotted communications between STAs and an AP.

2. Background Discussion

Millimeter wavelength (mm-wave or mmW) wireless networks are becoming increasingly important, despite their associated poor link budget. Yet, due to having a wavelength on the order of few millimeters, a large number of antennas can be implemented in a mmWave radio. These antenna systems can be made highly directive, in what is called beamforming. Beamforming communication takes advantage of the larger number of antennas to steer transmission towards desired radio directions, toward overcoming limitations in link budget.

FIG. 1A and FIG. 1B illustrate an example of directional and less, or non-directional, antennas. In FIG. 1A is seen an example set of directions, beams, which can be formed for mmW transmit and/or receive beamforming (BF). In the figure each beam can provide tens of dB gain in relation to received signal power for a (quasi)-omni antenna seen in FIG. 1B. The quasi-omni directional antenna is seen in the example, with basically two general directions, although the beam shapes vary significantly with different antennas. The distinction is that the directional antenna of FIG. 1A increases gain in the given direction, while reducing spurious transmissions.

Beamforming (BF) training is a bidirectional sequence of BF training frame transmissions that uses sector sweep and provides the necessary signaling to allow each station (STA) in the network to determine appropriate antenna system settings for both transmission and reception. In the IEEE 802.11ad standard (hereafter referred to as 802.11ad) the sector level sweep (SLS) is a mandatory phase. During SLS, a pair of STAs exchanges a series of sector sweep (SSW) frames over different antenna sectors to find the one providing the highest signal quality. The station that transmits first is called the initiator, while the second station is called the responder.

During a transmit sector sweep (TXSS), SSW frames are transmitted on different sectors while the pairing node (the responder) receives with a quasi-omni directional pattern. The responder determines the antenna array sector from the initiator which provided the best SNR.

FIG. 2 depicts directional transmission by an initiator STA for receipt by a responder STA. The responder determines that transmission sector directed toward itself is the one shown highlighted in the upper portion of FIG. 2.

FIG. 3 depict access periods in 802.11ad showing BF training and CBAP channel access in a typical scenario. In the figure is seen a beacon super frame having a beacon header interval (BHI) containing a beacon transmission interval (BTI) and association-beamforming training period (A-BFT). Sector level sweep is seen during the BTI and A-BFT intervals, with communications taking place between an initiator TXSS and multiple responders. Following the BHI is shown a data transmission interval (DTI) comprising a contention-based access period (CBAP). The DTI may contain channel time other than CBAP. Hereinafter, for the sake of simplicity of illustration and not limitation, it will be assumed that a DTI contains a single CBAP.

The access point (AP) does not know which STAs will transmit at any given time so it remains in quasi-omni reception. Two general embodiments of CSMA based access can be utilized in CBAP. (1) In a first embodiment there is no RTS/CTS, and the STAs contend for access through channel sensing and random back-off. The AP remains in quasi-omni transmission unless a STA requests further BF training at the beginning of the TXOP it won access to. It will be recognized that data frames of the STAs may collide at the AP when multiple STAs attempt to transmit frame to the AP. It is preferable if communication protocol implements additional mean to reduce the probability of the collision. (2) In a second embodiment RTS/Directional CTS is performed in which STAs contend for channel access through an RTS/CTS procedure. RTS frames may collide at the AP. After RTS/CTS exchange, AP may perform further BF training refinement and receive in directional mode.

FIG. 4 depicts another form of mmW access being scheduled access using service periods (SPs) in 802.11ad. The ownership of channel time is granted by the AP to a single STA to communicate with the AP. In addition, the AP may grant channel time to two stations to communicate together in a P2P mode, as is seen in SP3 with STA 1 communicating with STA 3. SP allocation is communicated prior to the DTI. The figure shows a BHI containing BTI and A-BFT and following by a DTI which contains multiple SPs. Depicted below the interval diagram blocks are shown iconic representation of an AP communicating with STA 1 during SP1, AP communicating with STA 2 during SP2, STA 1 communicating with STA 3 during SP3, and AP communicating with STA 3 during SP4. Only a single STA is allowed to access the channel in any given time slot, with a dedicated scheduling message being exchanged between the AP and the stations.

However, the link budget and MAC efficiency for the above approaches are still limited.

Accordingly, a need exists for enhanced access mechanisms within wireless communication networks. The present disclosure fulfills that need and provides additional benefits over previous technologies.

BRIEF SUMMARY

A contention-based random access mechanism is described making use of receive beamforming for use in wireless networks, and which is particularly well-suited for use in millimeter-wave (mmW) networks. The present disclosure utilizes a slotted random access mechanism having slots within which stations can contend for channel access. A mapping is performed of the transmit and receive sectors into a scheduled time for receiver (Rx) beamforming (BF), and this mapping is used by the access point (AP) to scan all receive sectors during a frame. Stations only attempt to access the channel in slot(s) corresponding to the mapping of the best BF sector from the AP.

The present disclosure provides a number of benefits, including both improved link budget and MAC efficiency, while reducing communications collisions at the AP. There is also a reduced need for extending BF training into the data transmission interval (DTI). Furthermore, overhead is reduced for the exchanging of explicit scheduling information from the AP to the STAs.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-omni antenna pattern. Beamforming is used at a transmitter to improve received signal power or signal-to-noise ratio (SNR) at an intended receiver.

BSS: Basic Service Set; a set of stations (STAs) that have successfully synchronized with an AP in the network.

BSSID: Basic Service Set Identification.

BHI: Beacon Header Interval which contains a beacon transmission interval (BTI) and association-beamforming training period (A-BFT).

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: a Medium Access Control (MAC) address.

Omni-directional: a non-directional antenna mode of transmission.

Quasi-Omni directional: a directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

RXBF: Receiver BeamForming.

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; The SP that is scheduled by the access point (AP). Scheduled SPs start at fixed intervals of time.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 5A and FIG. 5B are communication period diagrams showing a frame exchange between AP and two stations as utilized according to an embodiment of the present disclosure.

FIG. 11 is a data field diagram of a beacon frame format as utilized according to an embodiment of the present disclosure.

FIG. 12 is a data field diagram of a receiver BF control field format as utilized according to an embodiment of the present disclosure.

FIG. 13 is a data field diagram of schedule element content as utilized according to an embodiment of the present disclosure.

DETAILED DESCRIPTION

Figure 1A:
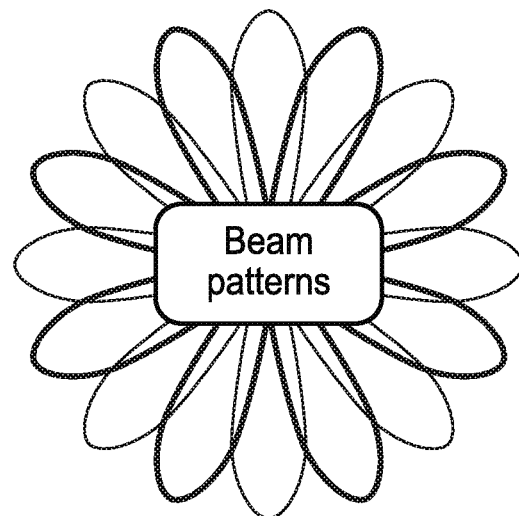
FIG. 1A and FIG. 1B are antenna pattern maps showing directional beam patterns compared with quasi-omni directional patterns.
Figure 1B:
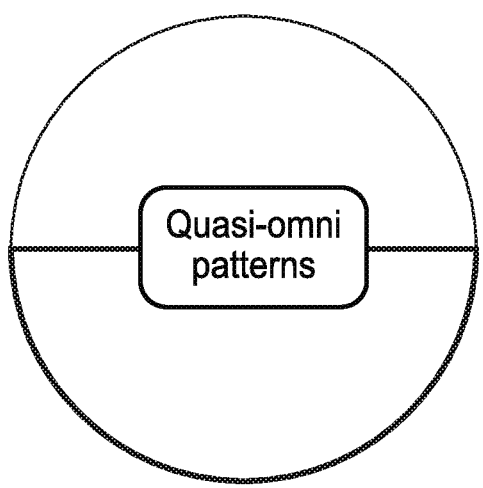
Figure 2:
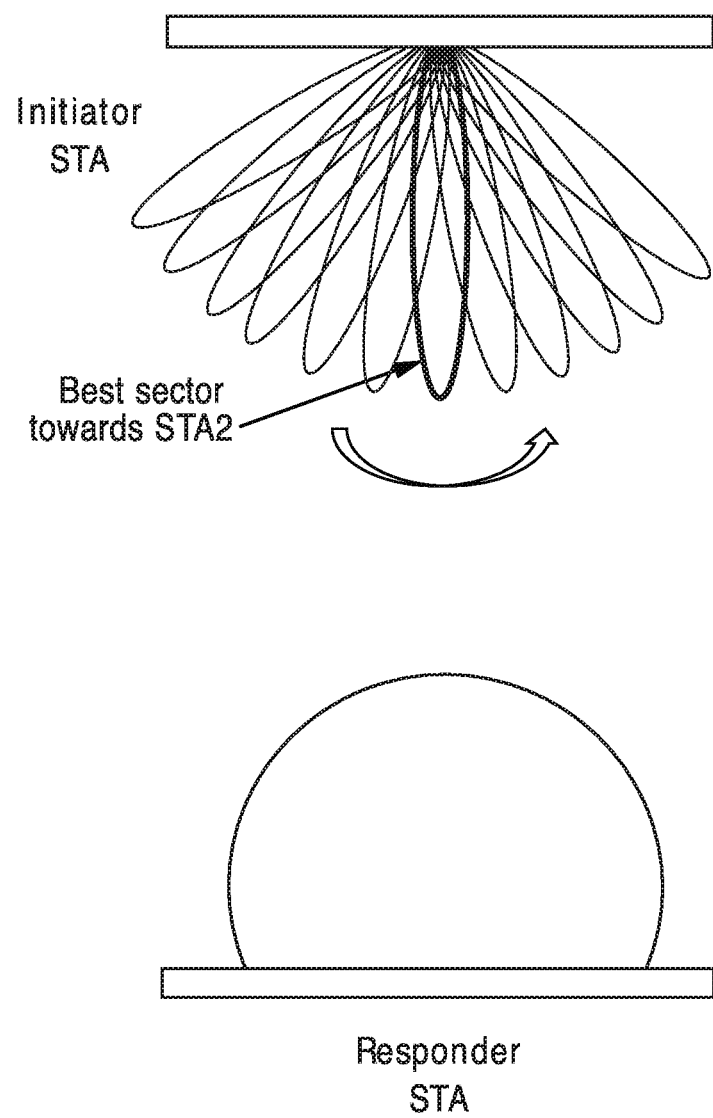
FIG. 2 are antenna beam patterns from an initiator station (STA) utilizing directional transmissions toward a responder STA receiving according to a quasi-omni pattern.
Figure 3:
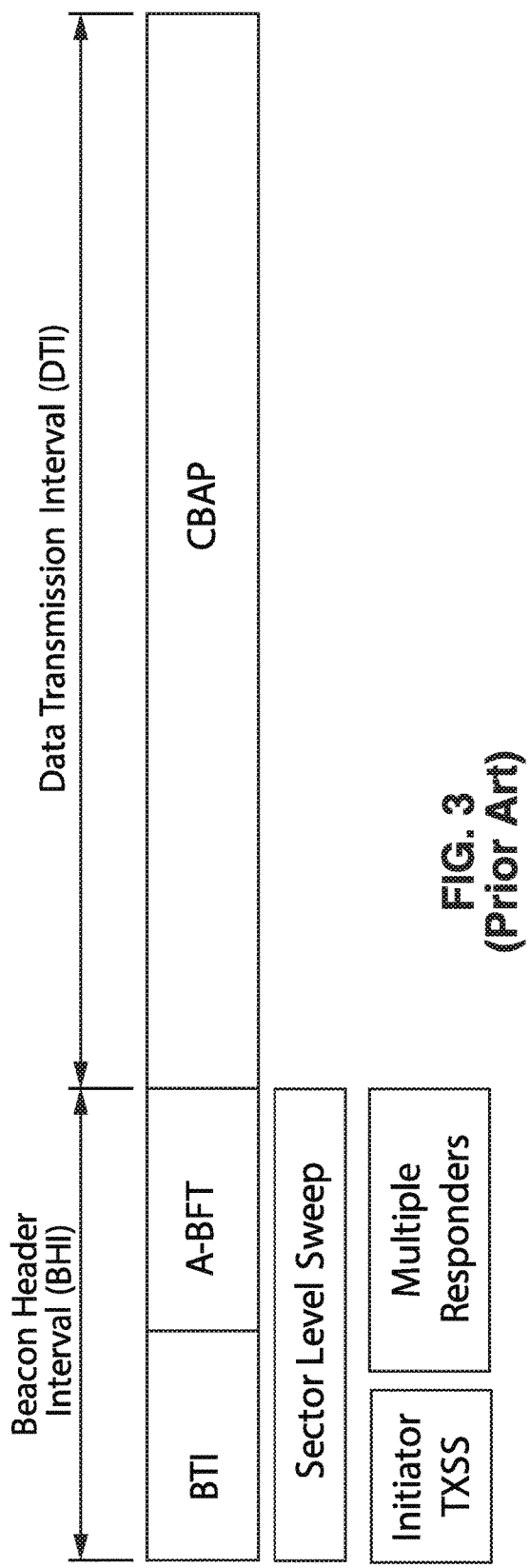
FIG. 3 is a communication period diagram showing access periods with a contention based access period (CBAP) as utilized in 802.11ad.
Figure 4:
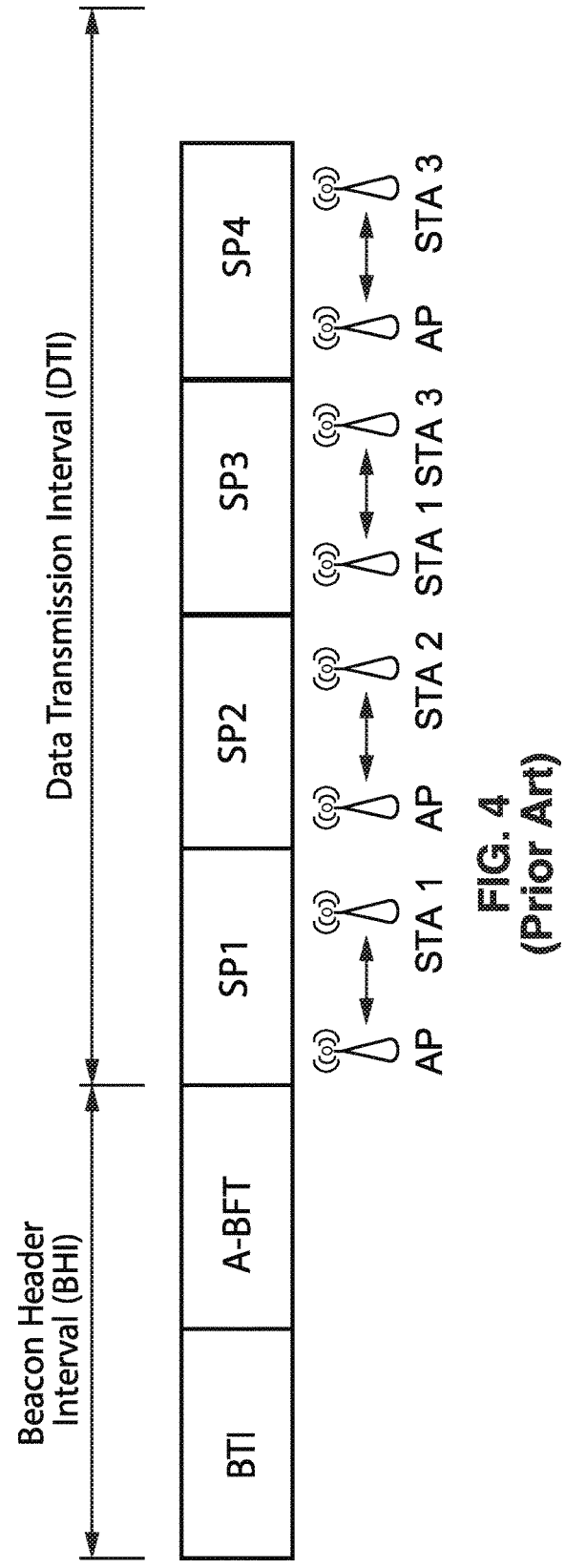
FIG. 4 is a communication period diagram showing scheduled access as implemented in 802.11ad.

1. Introduction to Slotted Contention Using RXBF

The disclosed communication protocol is configured for having the AP operate in receiver (RX) beamforming (BF) during the data transmission interval (DTI). The AP divides its Contention-Based Access Period (CBAP) in DTI into contention slots, and uses directional reception by beamforming, for receiving from a new antenna sector direction at each slot. In at least one embodiment, the AP RX BF covers all receiving directions during a CBAP in DTI. The exact pattern of RX BF across the slots of the DTI is determined through mapping of BF training information. Stations (STAs) on the network only need to know if RX BF mapping in slotted channel access mode is applied or not, such as utilizing a one bit signal (RXBF Flag subfield) in the frame(s) transmitted in BTI, i.e., Beacon frame, and can determine which transmission time slot to use based on the best sector direction from the AP.

2. Implementation of Contention Based Rx BF

FIG. 5A and FIG. 5B illustrate an example of frame transmissions in BHI. In FIG. 5A a beacon super frame is depicted showing a frame exchange example that is seen among AP, STA 1, and STA 2. In this figure BHI 11 is seen followed by DTI 15. BHI 11 is divided into BTI 12 and A-BFT 14, beneath which are seen the sector level sweep frames and the sector level sweep feedback frames 16. The AP transmits SSW frames 20 as beacon frames, STA 1 transmits a set of SSW frames 22 and STA 2 is also seen transmitting frames 24, with the AP seen transmitting feedback frames 26. Thus, it is seen in the figures that STAs receive beamformed Beacon signals, which are transmitted in sector sweep fashion in BTI. The STA compares the signal quality of each signal, and determines which sector is the best for itself. The STA responds back with SSW frame transmission in A-BFT, letting AP determine which sector is best for the AP, and the STA receives SSW Feedback from AP containing the STA's best sector toward AP.

FIG. 5B illustrates an example embodiment 10 of beacon header interval (BHI) showing BTI 12, A-BFT 14, as was shown in the FIG. 5A, sector level sweep and feedback are performed during BHI. Each STA and the AP obtain information listed in box 18 through this sector level sweep. Each station determines the number of AP sectors from which it receives transmission, the best of those sectors from the AP, and the best sector from the STA to the AP. The AP determines the best sectors from different STAs toward the AP.

After the BF training that occurs during the beacon header interval, the AP and the different STAs acquire information about BF best sectors as well as antenna capabilities of the AP. This information is then utilized to perform mapping into: (a) scheduled RX BF in the DTI, and (2) attempting channel access by the STAs (during their period in the DTI). When a STA attempts to transmit a frame to AP, the STA picks a time period that the AP is performing RX BF of which the beam gives best SNR. It should be appreciated that this disclosed solution does not require explicit signaling of which STAs will access the channel at each slot, thus overhead is significantly reduced.

2.1. Scheduled Rx BF at the AP

The programming of the AP is configured for performing slotted contention with RXBF according to the following steps. (1) The AP divides the contention based time by the number of sectors at the AP to obtain each slot interval Ts. It should be appreciated that all embodiments of the present disclosure can support any granularity (quantum) of antenna directionality, while beam patterns, such as seen in FIG. 1A, are provided by way of example and not limitation. In addition, it will be appreciated that these directions can arise from using a single communication circuit coupled to multiple antennas, or from multiple communications circuits each coupled to multiple antennas, such as having antenna arrays in each desired directional axis. (2) The best sector number toward every STA is obtained and recorded from the feedback received from the STA. The feedback is received within SSW frames transmitted in the A-BFT by the STA. However, if one antenna sector is the best sector towards numerous (too many) of the STAs, the system can fall back to using conventional CBAP, which is indicated by setting an RXBF flag to that condition. Otherwise, the RXBF flag is set to indicate slotted contention access with RXBF which is then utilized.

It should be noted that embodiments of the present disclosure can also be implemented to record other workable antenna directions, in addition to the best sector, and use these in certain circumstances, for example as an aid in separating STA communications to be across different slots instead of the same slot.

Scheduled Rx BF at the AP can be generally expressed as follows.

If (one sector is the best sector towards many STAs), then { fall back to state-of-the-art contention based access (e.g., CBAP) && set RXBF Flag to 0} else {set the RXBF Flag to 1 to signal slotted contention access with Rx BF}.

(3) The AP is configured for transmitting the RXBF flag in a Beacon frame transmitted in the BHI according to the value obtained from the previous step. (4) During the contention based access period (CBAP) in the data transmission interval (DTI) following the BHI, the AP applies Rx BF corresponding to each sector antenna pattern for a period of Ts.

Figure 6:
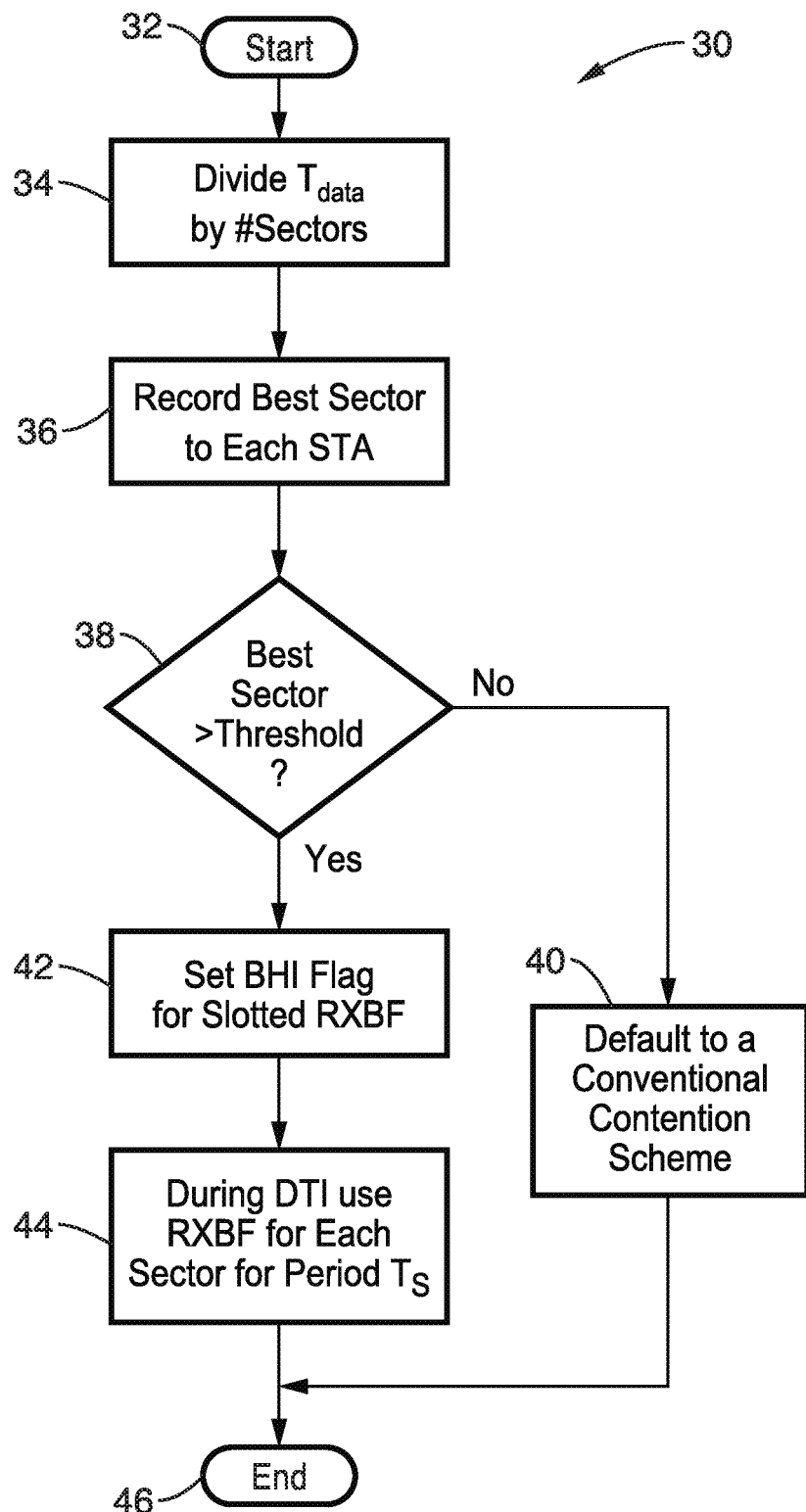
FIG. 6 is a flow diagram of scheduled RXBF as performed at the AP according to an embodiment of the present disclosure.

FIG. 6 illustrates an example embodiment 30 of contention based Rx BF as performed at the AP. The process starts 32 and determines the number of slots by dividing 34 the time of DTI by the number of antenna sectors which are the best sectors for communicating between the AP and one of the STAs in the network to arrive at the length of a time slot. At least the best sector is recorded 36 to each STA from the AP. A check is performed 38 to determine if the number of best sectors is above a selected threshold (e.g., are there enough best sectors to the STAs to warrant using contention based RXBF). For example if all the STAs were on a single best sector direction from the AP, or otherwise there are too few best sector directions to warrant performing RXBF, then the programming is configured for defaulting to performing 40 any desired conventional contention scheme (with slotted RXBF flag being clear in BHI), before ending 46 the process. If there are a sufficient number of best sector directions identified, then block 42 is reached which sets the slotted RXBF flag. Then in block 44 AP communication is performed during DTI by using receiver beamforming for each of the identified time slots. After all time slots have been so processed then the communication frame and process ends 46.

For the sake of simplicity of illustration and implementation, each slot is considered to be the same time length. However, embodiments of the present disclosure are contemplated in which time slots may be of different lengths arising from using something other than simply dividing the DTI time by the number of best sectors. For example, CBAP can be divided by the number of stations to obtain a length, and STAs which share a common antenna direction then would receive a time slot having a length which is a multiple of that determined length, thus providing them with more time for handling contention issues within that extended time slot. The above are given by way of example and not limitation, as the present invention can use various mechanisms for assigning slots in a scheduled manner between AP and STAs.

2.2. Scheduled Rx BF at the STA

Each station (STA) is configured for communication utilizing AP scheduled contention based RXBF according to the following steps. (1) Divide the contention based time by the number of sectors at the AP to obtain each slot interval Ts. As described later in relation to FIG. 9 and FIG. 10, the number of sectors at the AP is signaled to the STA through BF Slot subfield in the BF Control field contained in the Beacon frame transmitted by the AP. (2) Record the best sector from the AP. (3) Map the sector number to a corresponding slot number. It will be noted that steps 1-3 above provide the same results as determined in the same process performed at the AP, wherein the AP and STAs are consonant (equivalent) in terms of how they are using the slot assignments. (4) Receive and process the header (BHI) of the incoming frame. The RXBF slotted scheduling is performed if indicated by the channel access flag (e.g., bit), otherwise execution falls back on using some form of conventional contention access which matches that utilized by the AP. If using the disclosed RXBF slotted scheduling, then the STA applies transmitter beamforming (TX BF) towards the AP according to outcome from BF training, and attempts to transmit to the AP based on sector-to-slot mapping of step 3, followed by applying contention random access rules for channel sensing and the use of random back-off values. This can be expressed as follows.

If (RXBF Flag=1)
{ apply TX BF towards the AP according to BF training outcome
&& attempt transmission to AP according to the sectors-to-slots mapping from Step 3
&& apply contention random access rules in terms of channel sensing and applying random back-off values}
else if (RXBF Flag=0}
{fall back to state-of-the-art channel access rules, e.g. regular CBAP}

Figure 7:
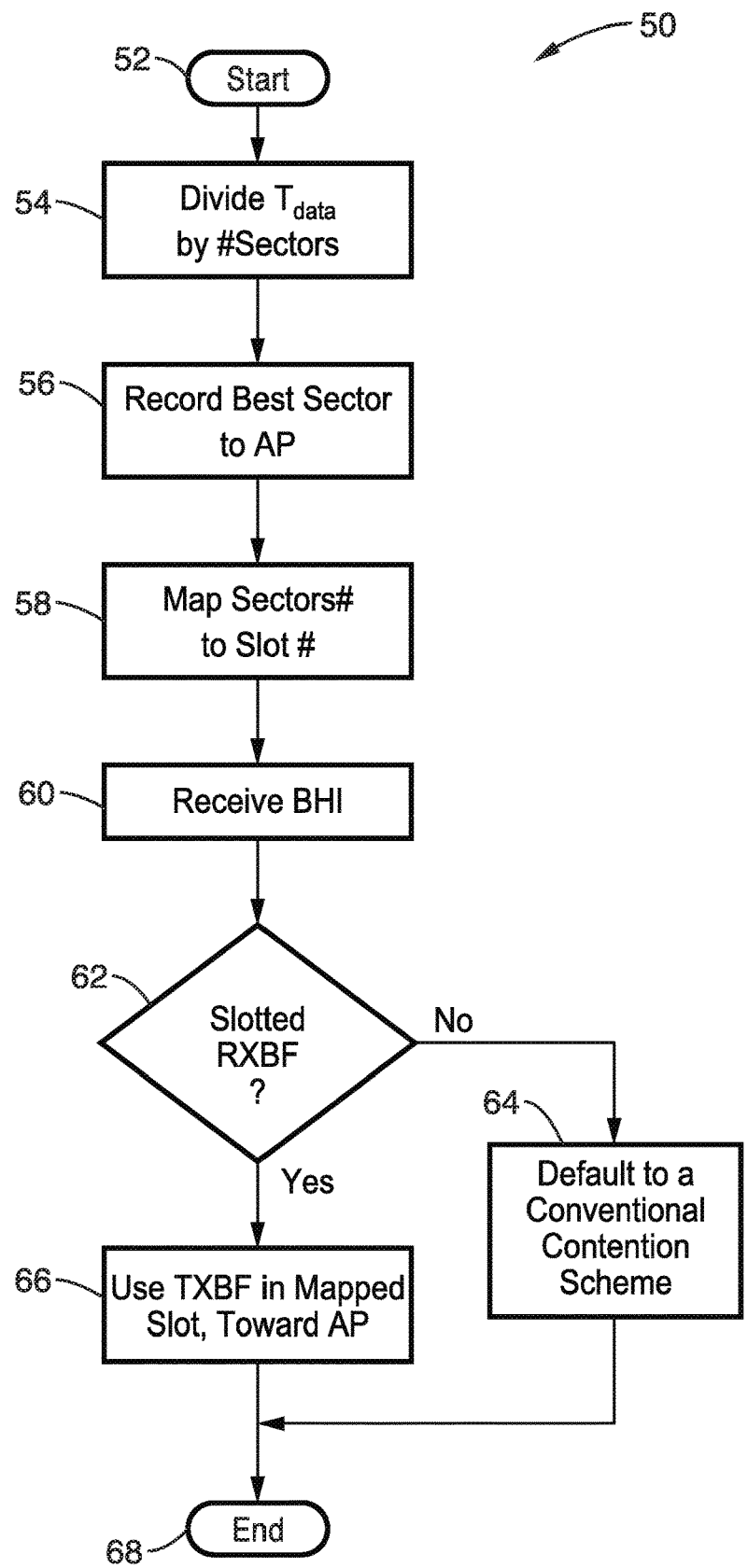
FIG. 7 is a flow diagram of scheduled RXBF as performed at the STA according to an embodiment of the present disclosure.

FIG. 7 illustrates an example embodiment 50 of scheduled RxBF at the STA. The process starts 52 and determines the number of slots by dividing 54 the time of DTI by the number of antenna sectors which are the best sectors for communicating between the AP and one of the STAs in the network to arrive at the length of a time slot. At least the best sector is recorded 56 to each STA from the AP. The STA then maps the antenna sector numbers to the time slots and arrives at the same determination for itself as was determined at the AP for that STA. The header information is received 60 and checked 62 for scheduled RXBF being selected. If the flag is not set, then the programming defaults execution 64 to the same conventional contention scheme as utilized at the AP and after DTI ends 68 the process. Otherwise, if slotted RXBF is selected, then the STA uses TXBF during the determined slot to communicate with the AP before ending 68.

3. Example of Utilizing Slotted Contention RXBF

Figure 8:
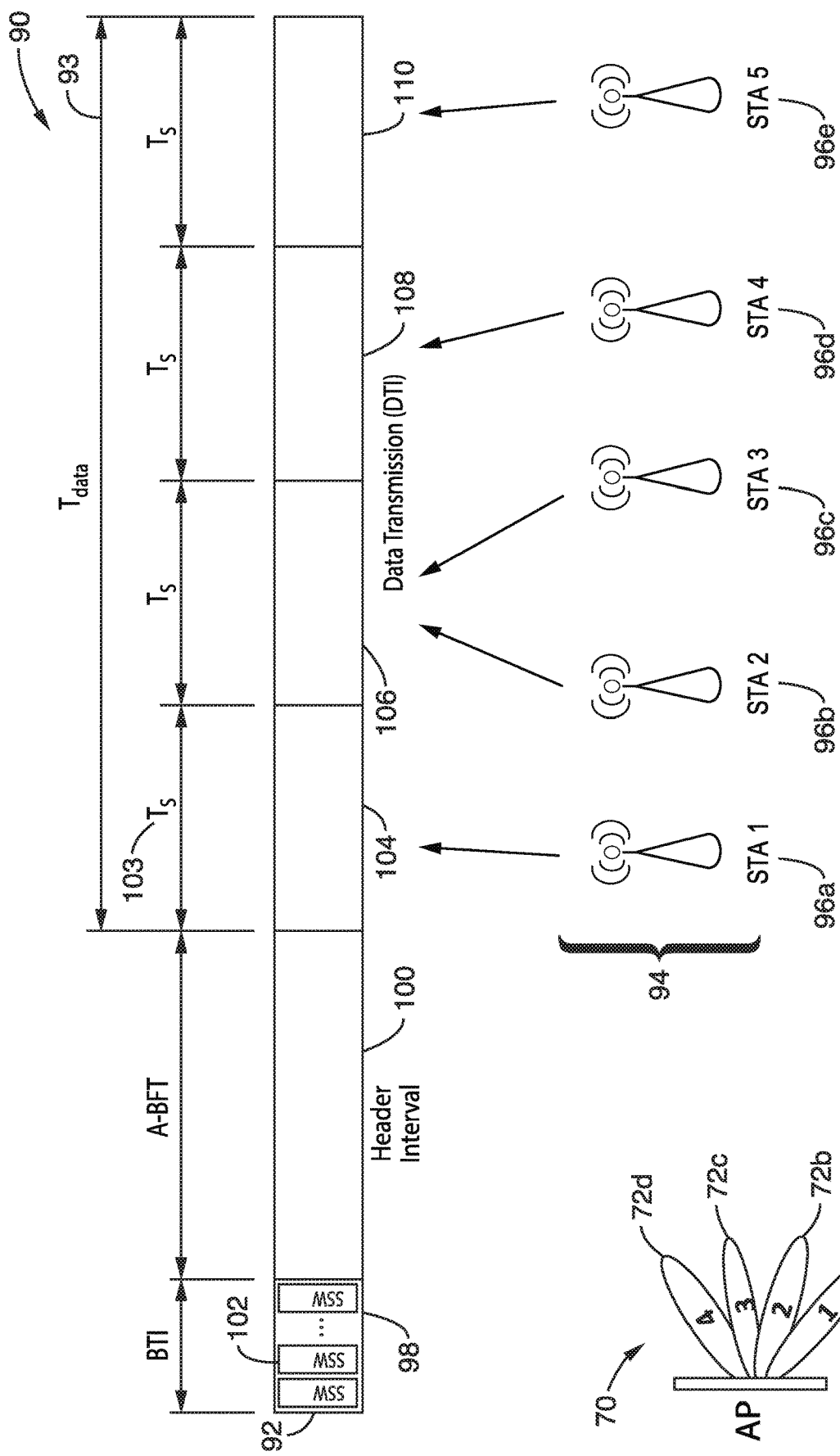
FIG. 8A and FIG. 8B are an antenna sector diagram and associated communication period diagram as utilized according to an embodiment of the present disclosure.

FIG. 8A illustrates an example embodiment 70 showing antenna sectors 72a, 72b, 72c, and 72d from the AP to different STAs or groups of STAs. In this example, the number of sectors is four, however, the present disclosure can be performed with any number of sectors (any desired threshold) so long as there are multiple sectors identified (e.g., equal or greater than two), otherwise it preferably defaults back to operating with conventional contention. Since four of these sectors are determined in this example, the DTI having length of $T_{data}$ is divided into four $T_s$ periods. Thus $T_s=T_{data}/\#sectors$, which in this example is $T_s=T_{data}/4$. The above example is seen in Table 1 showing a mapping of AP sectors to time slots and stations that will contend (e.g., STA2 and STA3) for channel access with each slot.

FIG. 8B illustrates an example embodiment 90 of communication periods 92 utilizing information from BF training to perform slotted channel access with scheduled Rx BF and selective contention. A beacon super frame with its header interval shown with BTI 98 and A-BFT 100. Inside BTI 98, Beacon frames 102 are transmitted in the form of sector sweep. The Beacon frame contains an RX BF flag subfield indicating if RXBF is operated in the corresponding CBAP. The Beacon frame also contains BF Slot subfield indicating how many slots the CBAP is divided into. The data interval (DTI) 93, of length Tdata, is in this example shown divided into four intervals 104, 106, 108 and 110, each of length Ts 103. It is seen in the station mapping 94 at the bottom of the figure, that STA 1 96a communicates during period 104 as STA1 has chosen the first sector of AP as the best sector, STA 2 96b and STA 3 96c communicate during period 106 as STA2 and STA3 has chosen the 2nd sector of AP as the best sector, STA 4 96d communicates during period 108 as STA4 has chosen the 3rd sector of AP as the best sector, and STA 5 96e communicates during period 110 as STA5 has chosen the 4th sector of AP as the best sector. As discussed, the AP may change the setting of the RXBF flag depending on the responses received from the STAs. After the AP changes the value of the RXBF Flag, the AP may transmit its SSW frames to STAs using the last slot of the A-BFT in order to instantly notify the change of the RXBF Flag.

Figure 9:
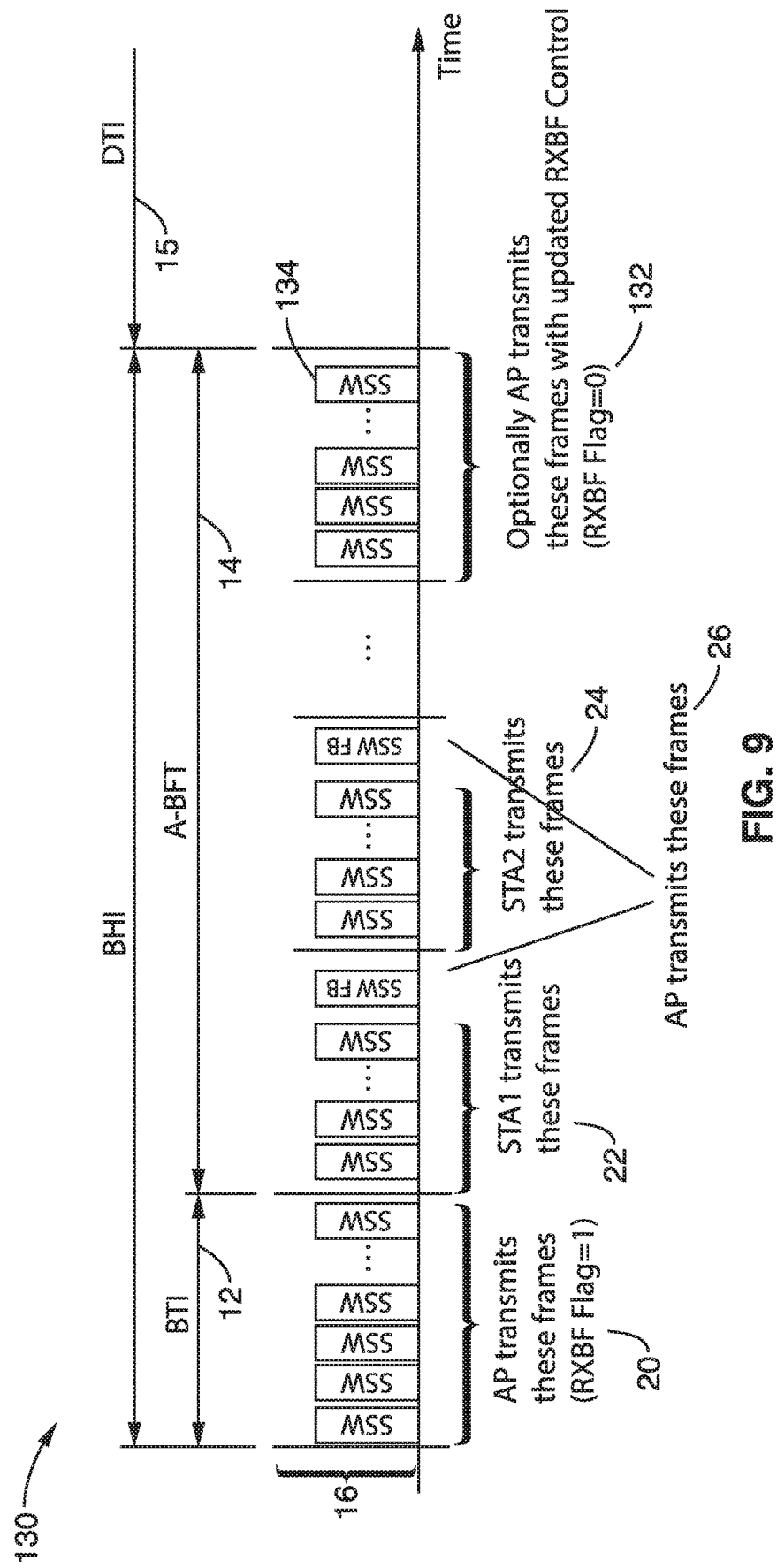
FIG. 9 is a communication period diagram showing frame transmissions in BHI with frame exchange between AP, STA 1 and STA 2 as utilized according to an embodiment of the present disclosure.

FIG. 9 illustrates an example embodiment 130, which extends what was shown in FIG. 5A. In this figure a beacon super frame is seen with the AP updating RXBF flag 132 which are transmitted in frames 134.

Figure 10:
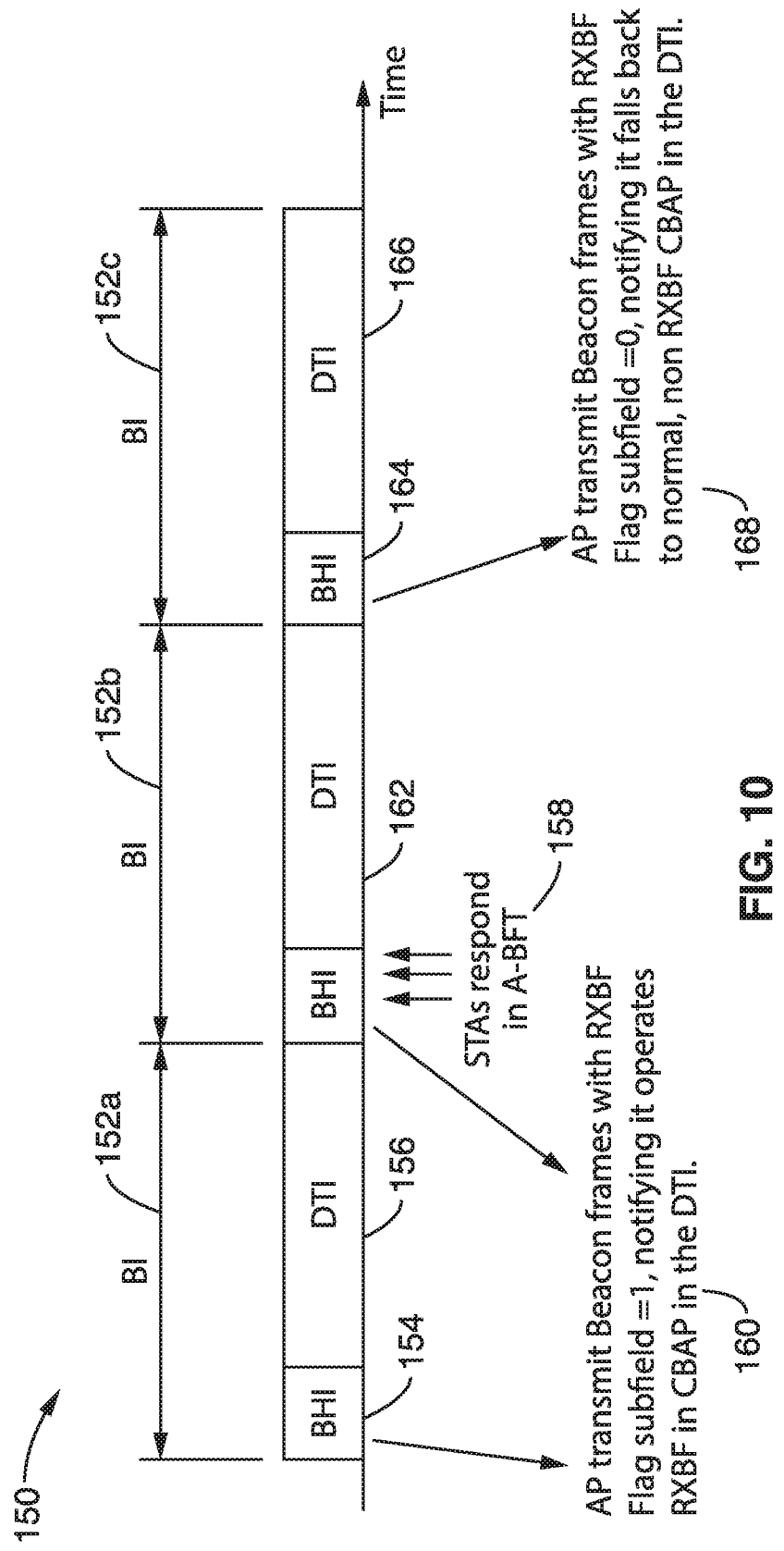
FIG. 10 is a communication period diagram showing beacon transmissions during which the AP changes its RXBF operating mode as utilized according to an embodiment of the present disclosure.

FIG. 10 illustrates an example embodiment 150 showing a number of beacon intervals (BIs) 152a, 152b, 152c. The AP may change the setting of the RXBF flag based on the history of STA behaviors that are communicating with the AP. At the first Beacon Interval (BI) 152a, AP sets RXBF Flag to 1 in BHI 154, to notify that RX beamforming is applied per slot in CBAP in the DTI 156. In the second BI 152b, the AP again transmitted RXBF flag set to 1 in BHI 160. However, the AP received new responses 158 from STAs indicating they have chosen the same sector of the AP as the best sector. As a result after DTI period 162, the AP decides to switch back to a conventional contention scheme. Thus, in the third BI 152c, the AP notifies STAs in BHI 164 that it will not apply RXBF in the CBAP, by clearing RXBF Flag subfield in the RXBF Control field in the Beacon frames, prior to DTI 166.

4. Data Structure for Slotted Contention RXBF

FIG. 11 illustrates an example embodiment 170 of a beacon frame format having the following fields and information elements. Frame Control: specifies type of the frame, etc., as defined in 802.11 specification. Duration: specifies time to the end of BTI, such as defined in 802.11 specification. BSSID: is the ID of the network, such as defined in 802.11 specification. TimeStamp: is a network timer value maintained by the transmitter of the frame, such as defined in 802.11 specification. SSW: sector sweep information, such as defined in 802.11 specification. Schedule: contains timing information when in the DTI STA can access to the media, such as defined in 802.11 specification. RXBF Control: specifies how the transmitter of the frame operate RXBF. Miscellaneous Info: other broadcasting information on the network attribute can be provided, such as defined in 802.11 specification.

FIG. 12 illustrates an example embodiment 190 of an RXBF control field format, including the following fields. RXBF Flag: indicates whether to use schedule RXBF or conventional contention, in this example embodiment it is set to 1 when RXBF is operated in contention period in DTI. Schedule index: specifies in which contention period the RXBF is operated. RXBF is operated in a CBAP of which the same Schedule Index is assigned in the Schedule element. BF Slot: indicates the number of slots for BF operation within the contention period (in the example in the previous page, 4 slots).

FIG. 13 illustrates an example embodiment 190 of a Schedule element format, including the following fields 192. Element ID: specifies type of the information element (indicates that this information block is for scheduling). Length: specifies length of the information element. Allocation: contains channel time schedule information. It should be appreciated that the AP may set multiple allocations in a DTI.

The allocation field above contains the following subfields 194. Schedule Index: an index of this particular allocation, which is used as an ID of the schedule instance. Allocation type: this specifies the type of schedule instance: (0) contention access, or (1) non-contention access. Allocation Start: this specifies the time when the schedule instance will be enabled. Allocation duration: this subfield specifies the time duration of the schedule instance. Number of Blocks is a subfield which specifies how many schedule blocks occur in the DTI. Allocation Block Period: this subfield specifies intervals between the schedule block.

5. General Scope of Embodiments

The enhancements described in the presented technology can be readily implemented within various wireless (e.g., mmWave) transmitters, receivers and transceivers. It should also be appreciated that modern wireless transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern wireless communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for communication in a wireless network, the apparatus comprising: (a) a wireless communication circuit configured for wirelessly communicating with other wireless communication stations in a wireless network utilizing directional wireless communication over a plurality of antenna pattern sectors each having different transmission directions; (b) a processor coupled to said wireless communication circuit within a station configured for operating on the wireless network; and (c) a non-transitory memory storing instructions executable by the processor; (d) wherein said instructions, when executed by the processor, perform steps comprising: (d)(i) dividing up a contention access period in the data transmission interval (DTI) into a plurality of time slots based on determining a number of antenna sector directions from an access point (AP) station to each station (STA) in the wireless network, so that each station (STA) is given an STA time slot, either for sole use by the station or shared with one or more other stations; (d)(ii) setting a receiver beamforming (RXBF) flag within a management frame transmitted by the access point (AP) if it is determined that scheduled receiver beamforming is to be utilized; and (d)(iii) using receiver beamforming at the access point (AP) station to control directional reception of data over each antenna sector direction in each STA time slot.

2. The apparatus of any preceding or following embodiment, wherein said instructions when executed by the processor further perform steps comprising dividing up the data transmission interval (DTI) into a plurality of time slots by dividing the DTI time period, $T_{data}$, by the number of best sectors determined from the access point (AP) to each of the stations (STA) in the wireless network, wherein each best sector is mapped to STA time slots.

3. The apparatus of any preceding or following embodiment, wherein said instructions when executed by the processor further perform steps comprising defaulting to a conventional contention access mechanism at the access point (AP) if it is determined by the access point (AP) that insufficient STA time slots exist.

4. The apparatus of any preceding or following embodiment, wherein said contention access period in the data transmission interval (DTI) comprises a Contention-Based Access Period (CBAP) during the time period within the data transfer interval (DTI) of a directional multi-gigabit (DMG) BSS where contention-based enhanced distributed channel access (EDCA) is utilized.

5. The apparatus of any preceding or following embodiment, wherein said instructions when executed by the processor perform steps for dividing up a contention access period in the data transmission interval (DTI) into a plurality of time slots in a specific pattern of RXBF across station time slots of the DTI through mapping of beamforming (BF) training information.

6. The apparatus of any preceding or following embodiment, wherein said instructions when executed by the processor perform steps for setting a receiver beamforming (RXBF) flag within a management frame by sending beacon frames which include a receiver control field that contains the receiver beamforming (RXBF) flag.

7. The apparatus of any preceding or following embodiment, wherein said instructions when executed by the processor perform steps for setting a receiver control field that contains the receiver beamforming (RXBF) flag and also comprises a schedule index which specifies in which contention period the RXBF is operated.

8. The apparatus of any preceding or following embodiment, wherein said instructions when executed by the processor perform steps for setting a receiver control field that contains the receiver beamforming (RXBF) flag and also comprises a beamforming (BF) slot indicating a number of slots for beamforming operation within the contention period.

9. The apparatus of any preceding or following embodiment, wherein said instructions when executed by the processor perform steps for setting the receiver beamforming (RXBF) flag as a binary bit indicating whether receiver beamforming (RXBF) or a conventional contention access method 10. The apparatus of any preceding or following embodiment, wherein said directional wireless communication is configured for operating with a plurality of beam directions from multiple antennas coupled to at least one communication circuit.

11. An apparatus for communication in a wireless network, the apparatus comprising: (a) a wireless communication circuit configured for wirelessly communicating with other wireless communication stations in a wireless network utilizing directional wireless communication over a plurality of antenna pattern sectors each having different transmission directions; (b) a processor coupled to said wireless communication circuit within a station configured for operating on the wireless network; and (c) a non-transitory memory storing instructions executable by the processor; (d) wherein said instructions, when executed by the processor, perform steps comprising: (d)(i) dividing up a contention access period in the data transmission interval (DTI) into a plurality of time slots based on determining a number of antenna sector directions from an access point (AP) station to each station (STA) in the wireless network, so that each station (STA) has an STA time slot, either for sole use by the station or shared with one or more other stations; (d)(ii) receiving a receiver beamforming (RXBF) flag within a management frame received at the station (STA) from the access point (AP) station; and (d)(iii) transmitting frames to the access point (AP) station by utilizing transmitter beamforming (TXBF) during the STA time slot for receipt by the access point (AP) station which is configured for utilizing receiver beamforming (RXBF) for receiving data over each antenna sector direction.

12. The apparatus of any preceding or following embodiment, wherein said instructions when executed by the processor further perform steps comprising dividing up the data transmission interval (DTI) into a plurality of time slots by dividing the DTI time period, $T_{data}$, by the number of best sectors determined from the access point (AP) to each of the stations (STA) in the wireless network, wherein each best sector is mapped to STA time slots.

13. The apparatus of any preceding or following embodiment, wherein said instructions when executed by the processor further perform steps comprising defaulting to a conventional contention access mechanism at the station (STA) if the receiver beamforming (RXBF) flag received from the access point (AP) is set to indicate performing the conventional contention access mechanism.

14. The apparatus of any preceding or following embodiment, wherein said instructions when executed by the processor perform steps for receiving a receiver beamforming (RXBF) flag within a management frame as sent by the access point (AP) comprising beacon frames which include a receiver control field that contains the receiver beamforming (RXBF) flag.

15. The apparatus of any preceding or following embodiment, wherein said instructions when executed by the processor perform steps for receiving a receiver control field that contains the receiver beamforming (RXBF) flag as sent by the access point (AP) and which also comprises a schedule index specifying in which contention period the RXBF is to be operated by the access point (AP).

16. The apparatus of any preceding or following embodiment, wherein said instructions when executed by the processor perform steps for receiving the receiver control field that contains the receiver beamforming (RXBF) flag and also comprises a beamforming (BF) slot indicating a number of slots for beamforming operation within the contention period.

17. The apparatus of any preceding or following embodiment, wherein said instructions when executed by the processor perform steps for receiving the receiver beamforming (RXBF) flag as a binary bit indicating whether receiver beamforming (RXBF) or a conventional contention access method is to be performed by the station.

18. The apparatus of any preceding or following embodiment, wherein said instructions when executed by the processor perform steps for the station (STA) to compares signal quality of each directional signal received from the access point (AP), determining which sector direction provides the best signal for the station (STA) itself, and communicating this sector directions of the best signal back to the access point (AP).

19. The apparatus of any preceding or following embodiment, wherein said instructions when executed by the processor perform steps for the station (STA) to transmit a frame to the access point (AP) by the station (STA) selecting a time period that the AP is performing RX BF which provides a best signal to noise ratio.

20. The apparatus of any preceding or following embodiment, wherein said directional wireless communication is configured for operating with a plurality of beam directions from multiple antennas coupled to at least one communication circuit.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Example Mapping of AP Sectors to Time Slots

| AP Sector<br>(Ref# of FIG. 8A) | STAs having this sector<br>as best sector from AP<br>(Ref# of FIG. 8B) |
|---|---|
| 1 (72a) | 1 (96a) |
| 2 (72b) | 2 & 3 (96b, 96c) |
| 3 (72c) | 4 (96d) |
| 4 (72d) | 5 (96e) |

What is claimed is:

1. An apparatus for communication in a wireless network, the apparatus comprising:
    (a) a wireless communication circuit configured as a station (STA) or access point (AP) for wirelessly communicating with other wireless communication stations as other STAs in the wireless network utilizing directional wireless communication over a plurality of antenna pattern sectors each having different transmission directions;
    (b) a processor coupled to said wireless communication circuit configured for operating on the wireless network; and
    (c) a non-transitory memory storing instructions executable by the processor;
    (d) wherein said instructions, when executed by the processor, perform steps comprising:
        (i) operating said station on said wireless network for maintaining communications with neighboring stations on the a wireless network;
        (ii) dividing up a data transmission interval (DTI) of a beacon super frame into multiple time slots in which directional antennas are utilized in transmission and reception;
        (iii) performing receiver beamforming (RXBF) at each time slot by said station operating as an Access Point (AP) to communicate with said other STAs assigned to these time slots;
        (iv) determining which antenna sectors are to be utilized in said time slots based on performing beamforming training between said station operating as the Access Point (AP) and said other STAs;
        (v) sending a mapping of slotted channel access from the Access Point (AP) to said other STAs, indicating allocations of each of these other STAs in regard to, duration of its time slots, location of its time slots in the beacon super frame, and assignment of its slots;
        (vi) switching to slotted channel access mode and determining which transmission time slot to use in response to receiving the mapping of slotted channel access from the Access Point (AP) within frames transmitted to said other STAs; and
        (vii) wherein said other STAs are configured to utilize assigned slots, based on received mapping of slotted channel access between the Access Point (AP) and each of said other STAs, to communicate with the Access Point (AP).

2. The apparatus of claim 1, wherein said instructions when executed by the processor further comprising dividing up said data transmission interval (DTI) into a first portion containing said multiple time slots in which only STAs assigned to these time slots are allowed to access the channel, and a second portion in which the DTI is utilized for conventional Contention Based Access Periods (CBAP).

3. The apparatus of claim 1, wherein said instructions when executed by the processor further comprising mapping of beamforming information communicated between the Access Point (AP) and each of said other STAs into a schedule of said receiver beamforming (RXBF) and channel access by said other STAs during their respective time slots during the DTI portion of the super beacon frame.

4. An apparatus for communication in a wireless network, the apparatus comprising:
    (a) a wireless communication circuit configured as a station (STA) or access point (AP) for wirelessly communicating with other wireless communication stations as other STAs in the wireless network utilizing directional wireless communication over a plurality of antenna pattern sectors each having different transmission directions;
    (b) a processor coupled to said wireless communication circuit configured for operating on the wireless network; and
    (c) a non-transitory memory storing instructions executable by the processor;
    (d) wherein said instructions, when executed by the processor, perform steps comprising:
        (i) operating said station on said wireless network for maintaining communications with neighboring stations on the wireless network;
        (ii) dividing up a data transmission interval (DTI) of a beacon super frame into multiple time slots in which directional antennas are utilized in transmission and reception, wherein said data transmission interval (DTI) into a first portion containing said multiple time slots in which only STAs assigned to these time slots are allowed to access the channel, and a second portion in which the DTI is utilized for conventional Contention Based Access Periods (CBAP);
        (iii) performing receiver beamforming (RXBF) at each time slot by said station operating as an Access Point (AP) to communicate with said other STAs assigned to these time slots;
        (iv) determining which antenna sectors are to be utilized in said time slots based on performing beamforming training between said station operating as the Access Point (AP) and said other STAs;
        (v) sending a mapping of slotted channel access from the Access Point (AP) to said other STAs, indicating allocations of each of these other STAs in regard to, duration of its time slots, location of its time slots in the beacon super frame, and assignment of its slots;
        (vi) switching to slotted channel access mode and determining which transmission time slot to use in response to receiving a mapping of slotted channel access from the Access Point (AP) within frames transmitted to said other STAs; and
        (vii) wherein said other STAs are configured to utilize assigned slots, based on received mapping of slotted channel access exchanged between the Access Point (AP) and each of said other STAs, to communicate with the Access Point (AP).

5. The apparatus of claim 4, wherein said instructions when executed by the processor further comprising mapping of beamforming information communicated between the Access Point (AP) and each of said other STAs into a schedule of said receiver beamforming (RXBF) and channel access by said STAs during their respective time slots during the DTI portion of the super beacon frame.

6. An apparatus for communication in a wireless network, the apparatus comprising:

(a) a wireless communication circuit configured as a station (STA) or access point (AP) for wirelessly communicating with other wireless communication stations as other STAs in the wireless network utilizing directional wireless communication over a plurality of antenna pattern sectors each having different transmission directions;
(b) a processor coupled to said wireless communication circuit configured for operating on the wireless network; and
(c) a non-transitory memory storing instructions executable by the processor;
(d) wherein said instructions, when executed by the processor, perform steps comprising:
  (i) operating said station on said wireless network for maintaining communications with neighboring stations on the wireless network;
  (ii) dividing up a data transmission interval (DTI) of a beacon super frame into multiple time slots in which directional antennas are utilized in transmission and reception;
  (iii) performing receiver beamforming (RXBF) at each time slot by said station operating as an Access Point (AP) to communicate with said other STAs assigned to these time slots wherein mapping is performed of beamforming information communicated between said station operating as the Access Point (AP) and each of said other STAs into a schedule of said receiver beamforming (RXBF) and channel access by the STAs during their respective time slots during the DTI portion of the super beacon frame;
  (iv) determining which antenna sectors are to be utilized in said time slots based on performing beamforming training between said station operating as the Access Point (AP) and said other STAs;
  (v) sending a mapping of slotted channel access from the Access Point (AP) to said other STAs, indicating allocations of each of these other STAs in regard to, duration of its time slots, location of its time slots in the beacon super frame, and assignment of its slots;
  (vi) switching to slotted channel access mode and determining which transmission time slot to use in response to receiving the mapping of slotted channel access from the Access Point (AP) within frames transmitted to said other STAs; and
  (vii) wherein said other STAs are configured to utilize assigned slots, based on received mapping of slotted channel access exchanged between the Access Point (AP) and each of said other STAs, to communicate with the Access Point (AP).

7. The apparatus of claim 6, wherein said instructions when executed by the processor further comprising dividing up said data transmission interval (DTI) into a first portion containing said multiple time slots in which only STAs assigned to these time slots are allowed to access the channel, and a second portion in which the DTI is utilized for conventional Contention Based Access Periods (CBAP).

8. A method of communication in a wireless network, the apparatus comprising:
(a) operating a wireless communication circuit which is configured as a station (STA) or access point (AP) for wirelessly communicating with other wireless communication stations as other STAs in the wireless network utilizing directional wireless communication over a plurality of antenna pattern sectors each having different transmission directions for maintaining communications with neighboring stations on the wireless network;
(b) dividing up a data transmission interval (DTI) of a beacon super frame into multiple time slots in which directional antennas are utilized in transmission and reception;
(c) performing receiver beamforming (RXBF) at each time slot by said station operating as an Access Point (AP) to communicate with said other STAs assigned to these time slots;
(d) determining which antenna sectors are to be utilized in said time slots based on performing beamforming training between said station operating as the Access Point and said other STAs;
(e) sending a mapping of slotted channel access from the Access Point (AP) to said other STAs, indicating allocations of each of said other STAs, duration of its time slots, location of its time slots in the beacon super frame, and assignment of its slots;
(f) switching to slotted channel access mode and determining which transmission time slot to use in response to receiving the mapping of slotted channel access from the Access Point (AP) within frames transmitted to said other STAs; and
(g) wherein said other STAs are configured to utilize assigned slots, based on received mapping of slotted channel access exchanged between the Access Point (AP) and each of said other STAs, to communicate with the Access Point (AP).

9. The method of claim 8, further comprising dividing up said data transmission interval (DTI) into a first portion containing said multiple time slots in which only STAs assigned to these time slots are allowed to access the channel, and a second portion in which the DTI is utilized for conventional Contention Based Access Periods (CBAP).

10. The method of claim 8, further comprising mapping of beamforming information communicated between the Access Point (AP) and each of said other STAs into a schedule of said receiver beamforming (RXBF) and channel access by said other STAs during their respective time slots during the DTI portion of the super beacon frame.

* * * * *